US012736187B2

(12) United States Patent
Fujimura et al.

(10) Patent No.: US 12,736,187 B2
(45) Date of Patent: Sep. 15, 2026

(54) GAS SUPPLY SYSTEM

(71) Applicant: TOYOTA JIDOSHA KABUSHIKI KAISHA, Toyota (JP)

(72) Inventors: Yoshikatsu Fujimura, Toyota (JP); Naoki Tomi, Kawasaki (JP); Tetsuya Tonosako, Fuji (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/278,132

(22) Filed: Jul. 23, 2025

(65) Prior Publication Data

US 2026/0132893 A1 May 14, 2026

(30) Foreign Application Priority Data

Nov. 12, 2024 (JP) ................................ 2024-197117

(51) Int. Cl.
*F17C 13/04* (2006.01)
*F17C 11/00* (2006.01)

(52) U.S. Cl.
CPC ............ *F17C 13/04* (2013.01); *F17C 11/005* (2013.01); *F17C 2250/0434* (2013.01); *F17C 2260/038* (2013.01)

(58) Field of Classification Search
CPC ................ F17C 7/00; F17C 2205/0323; F17C 2221/012; F17C 2250/03; F17C 2250/043; F17C 2260/036; F17C 2265/066; F17C 2270/0105; F17C 2270/0134; F17C 2270/0173; F17C 2270/0178; F17C 2270/0189; F17C 13/04; F17C 11/005; F17C 2250/0434; F17C 2260/038; B67D 7/3218; B67D 7/3209
USPC .......................................... 141/311 R; 222/3
See application file for complete search history.

(56) References Cited

U.S. PATENT DOCUMENTS

| | | | | |
|---|---|---|---|---|
| 4,410,109 | A * | 10/1983 | Murrell, Jr. | F16K 31/365 137/469 |
| 2011/0114193 | A1 * | 5/2011 | Chen | F17C 5/06 137/565.17 |
| 2023/0110816 | A1 * | 4/2023 | Mei | H01M 16/006 429/454 |
| 2024/0209989 | A1 * | 6/2024 | Hotta | F17C 13/025 |

FOREIGN PATENT DOCUMENTS

| | | |
|---|---|---|
| JP | 2024-089965 A | 7/2024 |

* cited by examiner

*Primary Examiner* — Christopher M Afful
(74) *Attorney, Agent, or Firm* — SoraIP, Inc.

(57) ABSTRACT

A gas supply system includes a gas tank with a self-closing valve, a gas supply pipe that connects the gas tank and a gas consuming device, a sealing, and a check valve disposed in the gas supply pipe. A push rod is provided to the gas supply pipe, and pushes open the self-closing valve. The sealing seals off a connection space including the self-closing valve and the distal end of the gas supply pipe when a distance between the self-closing valve and the push rod is equal to or less than a threshold value distance. A controller moves the gas tank forward until the self-closing valve is pushed open, and then backward to a position where the self-closing valve closes while maintaining sealing off of the connection space. The controller determines that a gas leak is occurring when pressure upstream of the check valve is lower than pressure downstream.

2 Claims, 5 Drawing Sheets

GAS SUPPLY SYSTEM

CROSS-REFERENCE TO RELATED APPLICATION

This application claims priority to Japanese Patent Application No. 2024-197117 filed on Nov. 12, 2024. The disclosure of the above-identified application, including the specification, drawings, and claims, is incorporated by reference herein in its entirety.

BACKGROUND

1. Technical Field

The technology that is disclosed in the present specification relates to a gas supply system that supplies a gas in a gas tank to a gas consuming device.

2. Description of Related Art

Japanese Unexamined Patent Application Publication No. 2024-89965 (JP 2024-89965 A) discloses a gas supply system that includes a plurality of gas tanks and supplies gas from the gas tanks to a gas consuming device. The gas supply system according to JP 2024-89965 A performs a gas leak check prior to replacing the gas tanks when the remaining gas amount in all the gas tanks becomes small. When the remaining amount of all the gas tanks becomes small, a controller of the system closes open/close valves of all the gas tanks, and shuts down the gas consuming device after consuming the gas in a gas supply pipe. Subsequently, the controller disconnects the gas tanks from the system after confirming that gas pressure in the gas supply pipe has not increased. When the gas pressure in the gas supply pipe increases, this indicates that there is a gas leak occurring from the open/close valves. In this case, when the gas tanks are disconnected from the system, the gas in the gas tanks leaks to the surrounding area. When the gas pressure in the gas supply pipe increases, the controller stops disconnection of the gas tanks.

SUMMARY

In the gas supply system according to JP 2024-89965 A, whether there is a gas leak is detected based on whether the gas pressure in the gas supply pipe is increased. Accordingly, it is necessary to temporarily stop gas supply to the gas consuming device in order to perform a gas leak check. The present specification provides technology that enables a gas leak check to be performed without stopping gas supply to a gas consuming device.

A gas supply system that is disclosed in the present specification includes a gas tank, a gas supply pipe, an actuator, a sealing, a check valve, first and second pressure sensors, and a controller. The gas tank includes a self-closing valve that opens when a push rod is pushed in and that closes when the push rod is pulled out. The gas supply pipe is connected to the gas tank. The push rod is provided at a distal end of the gas supply pipe, and the gas supply pipe leads gas from the gas tank to a gas consuming device. The actuator moves the gas tank forward and backward relative to the gas supply pipe. The sealing seals off a connection space including an opening of the self-closing valve and the distal end of the gas supply pipe, when a distance between the self-closing valve and the push rod is shorter than a predetermined threshold value distance. The check valve is provided in the gas supply pipe and suppresses backflow of gas. The first pressure sensor measures a pressure in the gas supply pipe upstream of the check valve. The second pressure sensor measures a pressure in the gas supply pipe downstream of the check valve.

The controller controls the actuator to move the gas tank forward until the self-closing valve is pushed open, and then to move the gas tank backward to a position where the self-closing valve is closed while maintaining the connection space in a sealed off state. Further, when a measurement value of the first pressure sensor is equal to or higher than a measurement value of the second pressure sensor after a predetermined amount of time elapses, the controller causes the gas tank to be moved forward such that the self-closing valve opens again, and when the measurement value of the first pressure sensor is lower than the measurement value of the second pressure sensor, outputs a signal indicating that a gas leak is occurring.

When the self-closing valve of the gas tank is opened, supply of gas to the gas consuming device is started. In the gas supply system that is disclosed in the present specification, a gas leak check is performed on an upstream side of the check valve in a state in which the gas supply pipe downstream of the check valve is filled with gas. While the gas tank is moved backward, the self-closing valve is closed, and a gas leak check is being performed, high-pressure gas that is accumulated in the gas supply pipe downstream of the check valve continues to be supplied to the gas consuming device. The gas supply system that is disclosed in the present specification can perform a gas leak check without stopping the gas supply to the gas consuming device.

In the gas supply system that is disclosed in the present specification, the gas supply pipe may be divided into a plurality of branch paths, and each of the branch paths may be provided with the first pressure sensor, the check valve, and the push rod. A gas tank is connected to each of the branch paths. The actuator is preferably capable of moving the gas tanks relative to the push rod on the respective branch paths. One gas tank can be replaced while gas is being supplied from the other gas tank to the gas consuming device.

Details of the technology that is disclosed in the present specification and further improvements will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
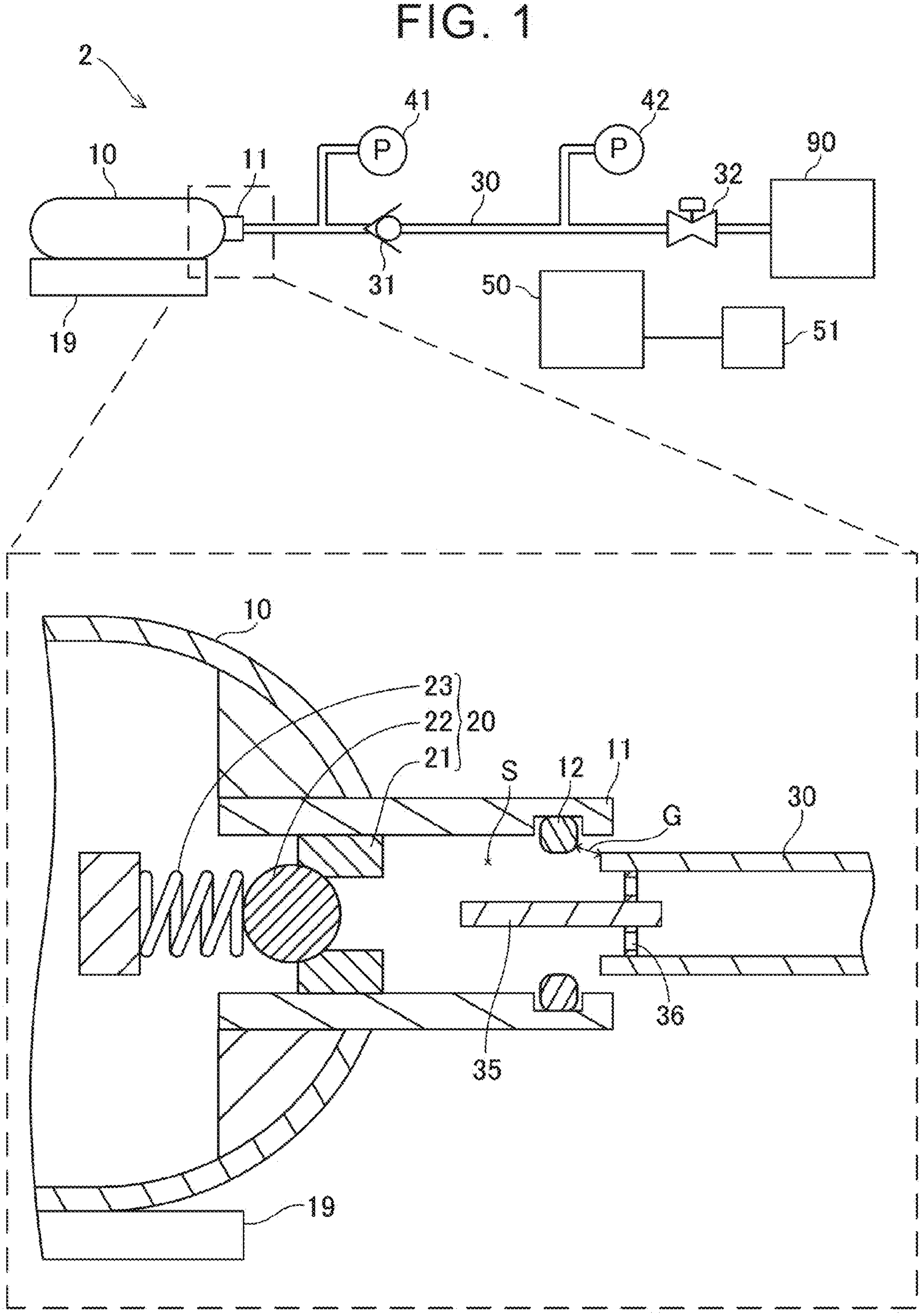
FIG. 1 is a block diagram of a gas supply system according to a first embodiment.

A gas supply system 2 according to a first embodiment will be described with reference to FIGS. 1 to 4. FIG. 1 is a block diagram of the gas supply system 2. A fuel cell 90 is connected to the gas supply system 2 according to the embodiment, and the gas supply system 2 supplies hydrogen gas from a gas tank 10 to the fuel cell 90. The fuel cell 90 is an example of a gas consuming device to which the gas supply system 2 supplies a gas.

The gas supply system 2 includes the gas tank 10, a gas supply pipe 30, a push rod 35, an actuator 19, a first pressure sensor 41, a second pressure sensor 42, a check valve 31, a controller 50, and a display device 51.

In the present embodiment, the gas tank 10 is filled with high-pressure hydrogen gas. The gas tank 10 and the fuel cell 90 are connected by the gas supply pipe 30. The gas supply pipe 30 leads the hydrogen gas in the gas tank 10 to the fuel cell 90. The check valve 31 and a pressure reducing valve 32 are connected to the gas supply pipe 30. The pressure reducing valve 32 is disposed downstream of the check valve 31. Here, the term "downstream" refers to the side of the gas supply pipe 30 that is closer to the fuel cell 90 (gas consuming device), and the term "upstream" refers to the side that is closer to the gas tank 10.

The pressure reducing valve 32 reduces pressure of the hydrogen gas that is supplied from the gas tank 10 to a pressure that is suitable for operation of the fuel cell 90. That is to say, the gas pressure that is suitable for operation of the fuel cell 90 is lower than the pressure of the gas that is supplied from the gas tank 10.

The check valve 31 allows gas to pass from upstream to downstream, and keeps gas from flowing from downstream to upstream. The check valve 31 suppresses hydrogen gas from leaking to the outside from downstream of the check valve 31, in a case in which a gas leak occurs at a connection point between the gas tank 10 and the gas supply pipe 30.

The first pressure sensor 41 measures pressure in the gas supply pipe 30 upstream of the check valve 31. When the gas tank 10 is connected to the gas supply pipe 30, a measurement value of the first pressure sensor 41 is substantially equal to internal pressure of the gas tank 10 (the measurement value is lower than the internal pressure of the tank by an amount corresponding to a pressure loss due to a self-closing valve 20 described below, and so forth).

The second pressure sensor 42 measures pressure in the gas supply pipe 30 downstream of the check valve 31. While gas is being supplied from the gas tank 10, a measurement value of the second pressure sensor 42 is substantially equal to the measurement value of the first pressure sensor 41 (the measurement value of the second pressure sensor 42 is lower than the measurement value of the first pressure sensor 41 by an amount corresponding to a pressure loss due to the check valve 31, and so forth).

A cross-sectional view of a neck 11 of the gas tank 10 and a distal end of the gas supply pipe 30 is illustrated on the lower side of FIG. 1. The neck 11 of the gas tank 10 includes the self-closing valve 20. The self-closing valve 20 includes a sleeve 21, a valve body 22, and a spring 23. The sleeve 21 is attached on an inner side of the neck 11. The valve body 22 is disposed adjacent to the sleeve 21 within the tank. The spring 23 presses the valve body 22 against an opening of the sleeve 21 (opening that opens into the tank) from inside the tank. An end of the spring 23 on the other side thereof is supported by an inner wall of the tank.

The valve body 22 is in close contact with the opening of the sleeve 21, under force of the spring 23. The self-closing valve 20 is closed while the valve body 22 is in close contact with the opening of the sleeve 21. The self-closing valve 20 opens when the valve body 22 is pushed toward the inner side from the outside of the tank. When a load on the valve body 22 is removed, the force of the spring 23 causes the valve body 22 to come back into close contact with the opening of the sleeve 21, thereby closing the self-closing valve 20.

The push rod 35 is provided at the distal end of the gas supply pipe 30. The push rod 35 is fixed to the distal end of the gas supply pipe 30 by a rod support 36. The rod support 36 has holes that are provided therein, through which gas can flow from the gas tank 10 into the gas supply pipe 30.

When the gas tank 10 is set in the gas supply system 2, the push rod 35 at the distal end of the gas supply pipe 30 faces the neck 11. The actuator 19 moves the gas tank 10. The actuator 19 moves the gas tank 10 closer to and away from the gas supply pipe 30. More specifically, the actuator 19 moves the self-closing valve 20 closer to and away from the distal end of the gas supply pipe 30 (i.e., the push rod 35). The cross-sectional view in FIG. 1 illustrates a state in which the push rod 35 is away from the self-closing valve 20.

The actuator 19 moves the gas tank 10 forward and backward relative to the distal end of the gas supply pipe 30. When the gas tank 10 moves closer to the gas supply pipe 30, this is referred to as "moving forward", and when the gas tank 10 moves away from the gas supply pipe 30, this is referred to as "moving backward". The actuator may move the gas supply pipe 30 forward and backward relative to the gas tank 10.

A sealing 12 is disposed inside the neck 11. When the distal end (push rod 35) of the gas supply pipe 30 moves closer to the self-closing valve 20, an outer periphery of the gas supply pipe 30 comes into contact with the sealing 12, and a space including an opening of the self-closing valve 20 (opening that opens to the outside of the gas tank 10) and the distal end of the gas supply pipe 30 is sealed off. For convenience, the space including the opening of the self-closing valve 20 and the distal end of the gas supply pipe 30 will be referred to as "connection space S". More precisely, the connection space S refers to space that is inside the neck 11 including the opening of the self-closing valve 20 and the distal end of the gas supply pipe 30. In the cross-sectional view in FIG. 1, the push rod 35 is away from the self-closing valve 20, and a gap G is maintained between the distal end of the gas supply pipe 30 and the sealing 12. In this state, the connection space S is not sealed off from the external environment.

Figure 2:
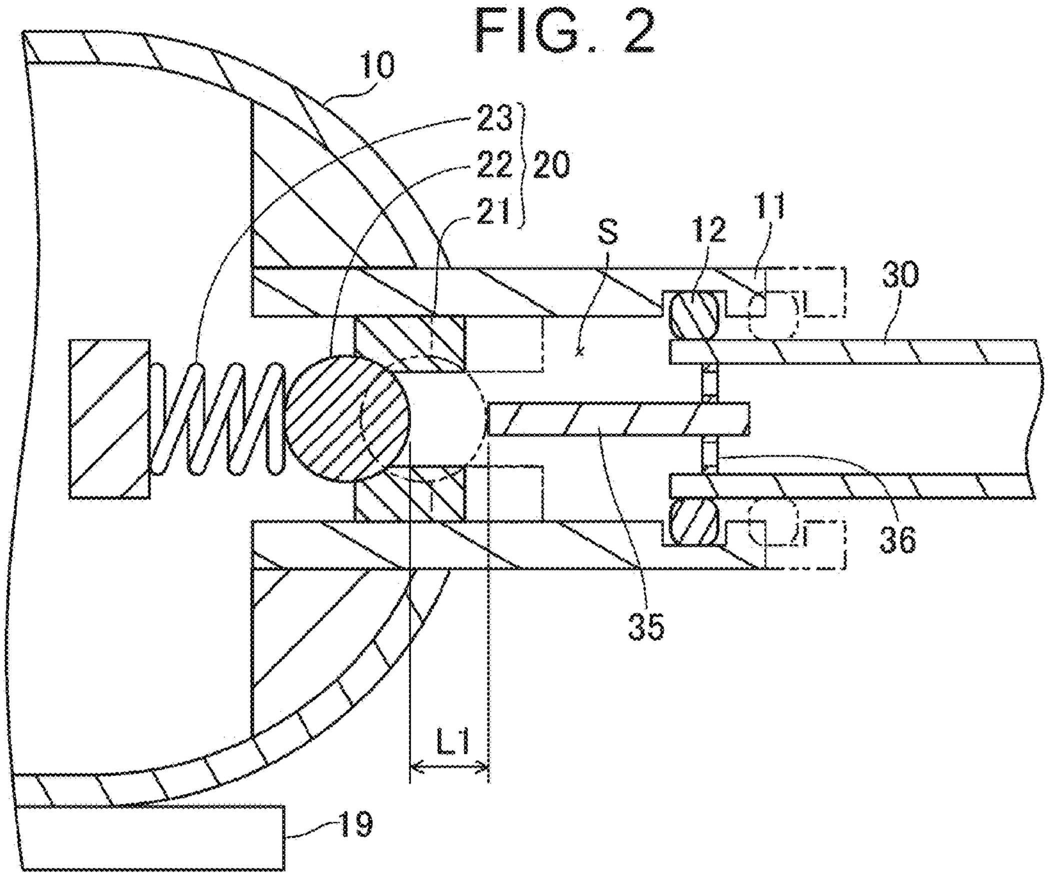
FIG. 2 is a cross-sectional view of a gas tank and a gas supply pipe (sealing position)

FIG. 2 illustrates a cross section in which the distal end of the gas supply pipe 30 is in contact with the sealing 12. When a distance between the push rod 35 and the self-closing valve 20 reaches L1, the sealing 12 comes into contact with the outer periphery of the gas supply pipe 30, and the connection space S is sealed off. In other words, when the distance between the push rod 35 and the valve body 22 of the self-closing valve 20 becomes shorter than L1, the connection space S is shut off from the external environment. When the distance between the push rod 35 and the valve body 22 is L1, the self-closing valve 20 remains closed. The distance L1 may be referred to as a threshold distance.

Figure 3:
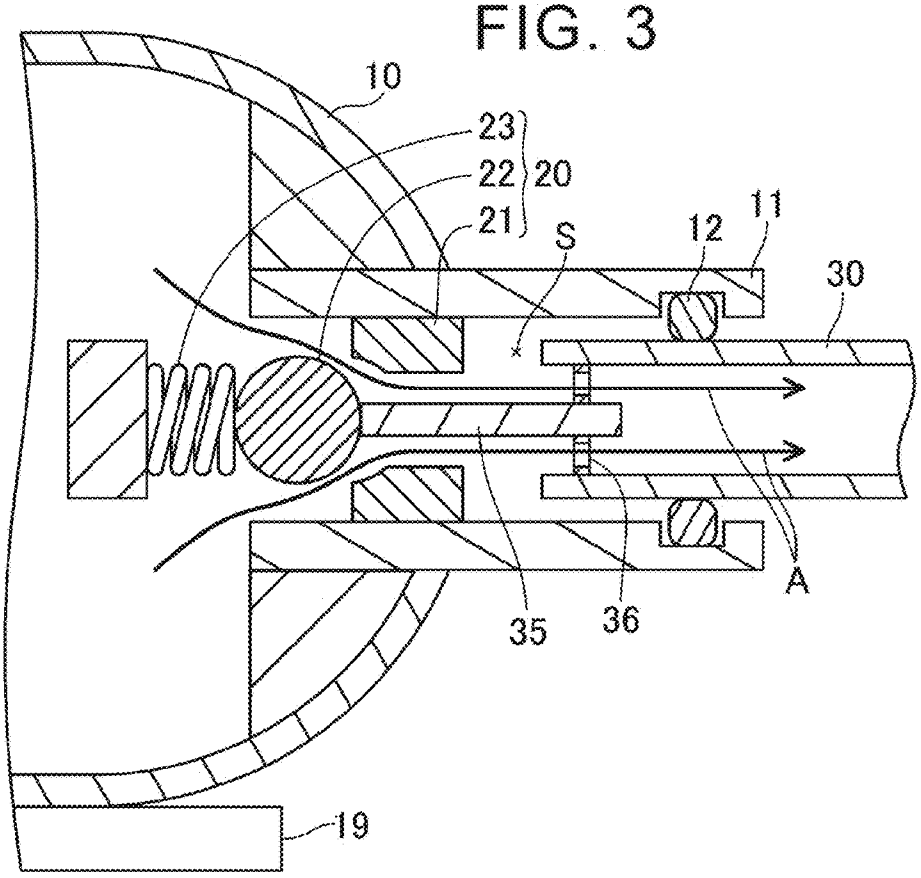
FIG. 3 is a cross-sectional view of the gas tank and the gas supply pipe (open valve position)

The hidden outlines in FIG. 2 indicate a state in which the gas tank 10 has moved forward until the valve body 22 comes into contact with the distal end of the push rod 35. When the gas tank 10 moves further forward than the hidden outlines, the push rod 35 pushes the self-closing valve 20 open. FIG. 3 is a cross-sectional view in which the gas tank 10 has moved forward until the self-closing valve 20 is opened. Heavy arrows A indicate flow of the gas. While the self-closing valve 20 is open, the hydrogen gas in the gas tank 10 passes through the connection space S to the gas supply pipe 30. The connection space S is sealed off by the sealing 12, and accordingly the hydrogen gas does not leak to the outside.

The gas in the gas tank 10 passes through the self-closing valve 20 that is open, passes through the holes in the rod support 36, and flows to the gas supply pipe 30. For the convenience of description, the position of the gas tank 10 when the connection space S is sealed off but the self-closing valve 20 is closed will be referred to as "sealing position", and the position of the gas tank 10 when the connection space S is sealed off and the self-closing valve 20 is open will be referred to as "open valve position". FIG. 2 is a cross-sectional view in the sealing position, and FIG. 3 is a cross-sectional view in the open valve position. The sealing position is a situation in which the distance between the push rod 35 and the valve body 22 of the self-closing valve 20 is equal to or smaller than L1 and also greater than zero. Also in the open valve position, the sealing 12 is in contact with the outer periphery of the gas supply pipe 30, and the connection space S remains sealed off.

Figure 4:
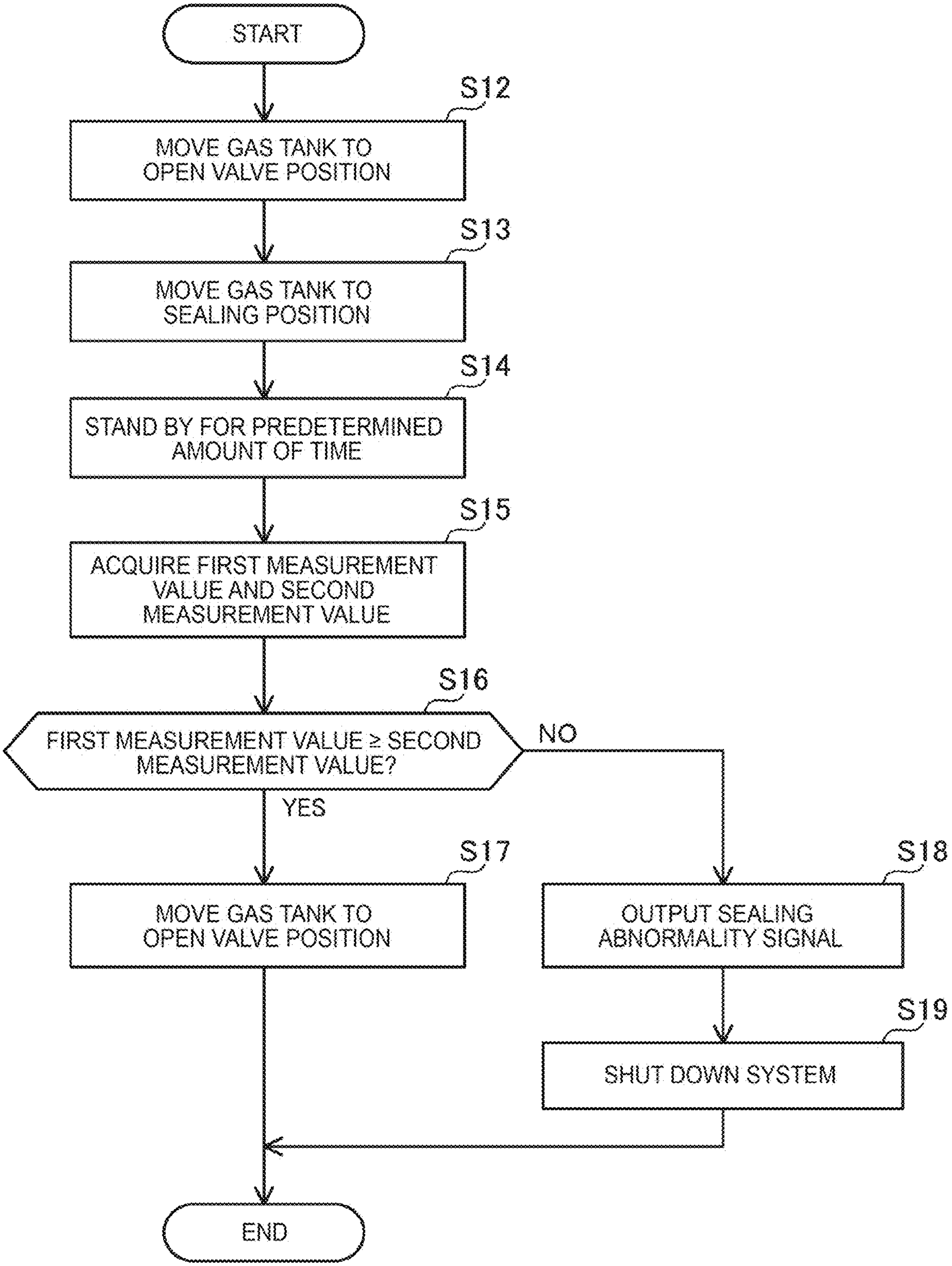
FIG. 4 is a flowchart of gas leak check processing.

The controller 50 (see FIG. 1) controls the actuator 19, and checks for gas leaks at the sealing 12. FIG. 4 is a flowchart of gas leak check processing. The controller 50 starts the gas leak check processing when the gas tank 10 is set in the gas supply system 2 (actuator 19).

Next, the gas leak check processing will be described with reference to the flowchart in FIG. 4. The gas leak check processing starts when the gas tank 10 is set in the gas supply system 2. The controller 50 moves the gas tank 10 to the open valve position (step S12). The self-closing valve 20 opens, and the hydrogen gas in the gas tank 10 flows to the gas supply pipe 30. The hydrogen gas is supplied to the fuel cell 90 through the gas supply pipe 30. The fuel cell 90 is thus in an operable state, due to the hydrogen gas being supplied thereto. The fuel cell 90 may start operation.

Subsequently, the controller 50 moves the gas tank 10 to the sealing position (step S13). The controller 50 then stands by for a predetermined amount of time (step S14). When the gas tank 10 moves to the sealing position, the self-closing valve 20 is closed, but a region further downstream of the check valve 31 is filled with a high-pressure hydrogen gas, the hydrogen gas continues to be supplied to the fuel cell 90 for a certain duration. That is to say, the fuel cell 90 can continue to operate.

After standing by for the predetermined amount of time, the controller 50 acquires measurement values of the first pressure sensor 41 and the second pressure sensor 42, and compares the measurement values with each other (steps S15 and S16). In FIG. 4, the measurement value of the first pressure sensor 41 is written as "first measurement value", and the measurement value of the second pressure sensor 42 is written as "second measurement value".

In step S15, the first measurement value (the measurement value of the first pressure sensor 41) indicates pressure in the connection space S. The second measurement value (the measurement value of the second pressure sensor 42) indicates pressure in the gas supply pipe 30 further downstream of the check valve 31. When no gas is leaking from the connection space S, the first measurement value is maintained. When gas is leaking from the connection space S, the first measurement value continues to decrease for a predetermined amount of time.

When the first measurement value is equal to the second measurement value or higher than the second measurement value, the controller 50 moves the gas tank 10 to the open valve position again (YES in step S16, and step S17). When the first measurement value is equal to or higher than the second measurement value even after the predetermined amount of time has elapsed, determination can be made that no gas leak is occurring from the connection space S that is sealed off by the sealing 12. In this case, the controller 50 moves the gas tank 10 to the open valve position, opens the self-closing valve 20, and continues supplying gas from the gas tank 10 to the fuel cell 90.

When the first measurement value is lower than the second measurement value, the controller 50 outputs a sealing abnormality signal to the display device 51, and shuts down the gas supply system 2 and the fuel cell 90 (NO in step S16, and steps S18, S19). The sealing abnormality signal is a signal indicating that a gas leak is occurring at the sealing 12. The display device 51 that has received the sealing abnormality signal turns on a warning lamp indicating that a gas leak is occurring at the sealing 12 (or the display device 51 emits a warning sound).

When the first measurement value is lower than the second measurement value after the predetermined time has elapsed, determination can be made that gas in the connection space S is leaking to the outside past the sealing 12. That is to say, determination can be made that a sealing abnormality is occurring. In this case, the controller 50 outputs a sealing abnormality signal indicating that a gas leak is occurring at the sealing 12. At this time, the controller 50 holds the gas tank 10 in the sealing position. The self-closing valve 20 is closed in the sealing position, and accordingly gas in the connection space S does not leak to the outside. Also, the gas supply pipe 30 is provided with the check valve 31, and accordingly gas filling the gas supply pipe 30 on the downstream side of the check valve 31 does not leak into the connection space S.

As described above, the gas supply system 2 can perform a gas leak check regarding the sealing 12 without stopping the gas supply to the fuel cell 90 (gas consuming device).

Supplementary description will be made regarding the actuator 19. In the gas supply system 2 according to the embodiment, the actuator 19 moves the gas tank 10 (self-closing valve 20) closer to and away from the gas supply pipe 30 (push rod 35). The actuator may be an arrangement that moves the gas supply pipe 30 (push rod 35) closer to and away from the self-closing valve 20. That is to say, it is sufficient for the actuator to be any device that moves the gas tank 10 forward and backward relative to the gas supply pipe 30.

In the gas supply system 2 according to the embodiment, after the gas tank 10 is set, the controller 50 performs the following processing as the gas leak check processing. (1) The controller 50 controls the actuator 19 to move the gas tank 10 forward until it pushes open the self-closing valve 20, and then moves the gas tank 10 backward while maintaining the connection space S sealed off, to a position at which the self-closing valve 20 is closed. In other words, the controller 50 controls the actuator 19 so as to relatively move the gas tank 10 closer to the gas supply pipe 30 until the self-closing valve 20 is pushed open, and then relatively moves the gas tank 10 away from the gas supply pipe 30 to a position at which the self-closing valve 20 is closed while maintaining the connection space S sealed off.

(2) When the measurement value of the first pressure sensor 41 is equal to or higher than the measurement value of the second pressure sensor 42 after the predetermined amount of time has elapsed, the controller 50 moves the gas tank 10 forward such that the self-closing valve 20 opens again. In other words, when the measurement value of the first pressure sensor 41 is equal to or higher than the measurement value of the second pressure sensor 42 after the predetermined amount of time elapses, the controller 50 relatively moves the gas tank 10 toward the gas supply pipe such that the self-closing valve 20 opens again. On the other hand, when the measurement value of the first pressure sensor 41 is lower than the measurement value of the second pressure sensor 42, the controller 50 outputs a sealing abnormality signal indicating that a gas leak is occurring.

In the embodiment, the sealing abnormality signal is sent to the display device 51. The display device 51 that has received the sealing abnormality signal outputs a notification (message, warning light, warning sound, or the like) indicating that a gas leak is occurring at the sealing 12.

Second Embodiment

Figure 5:
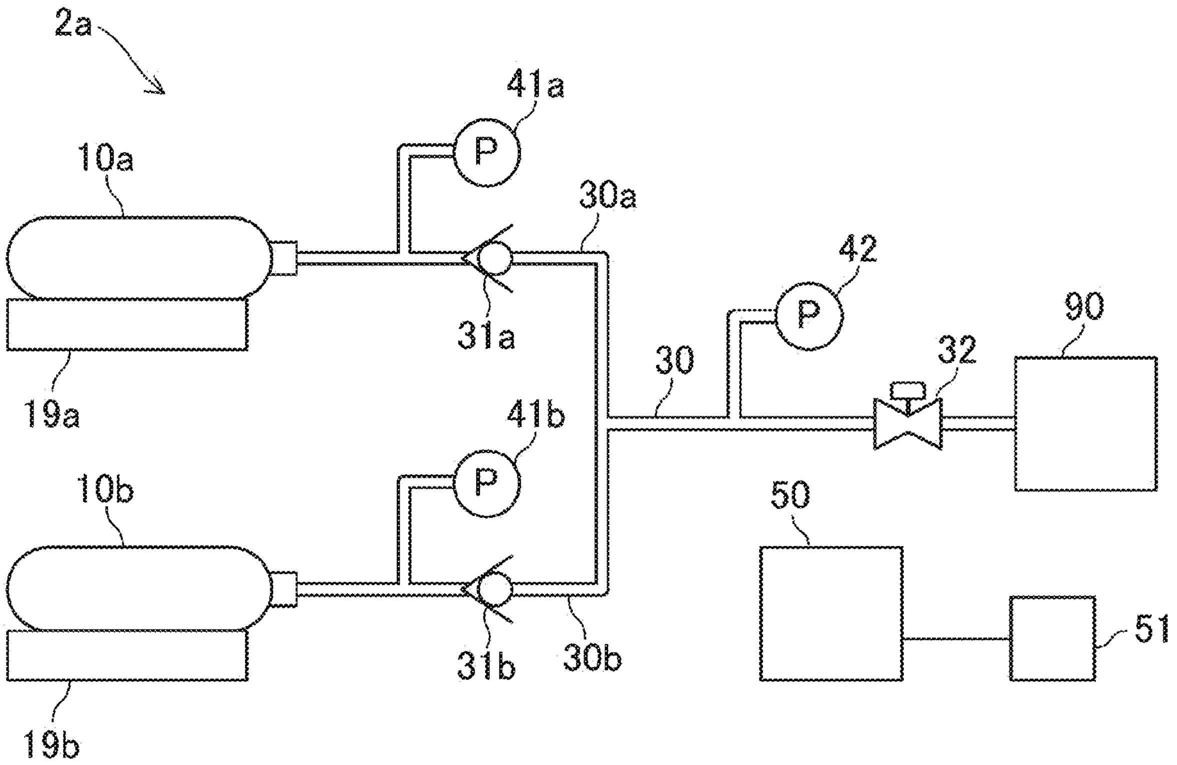
FIG. 5 is a block diagram of a gas supply system according to a second embodiment.
Figure 6:
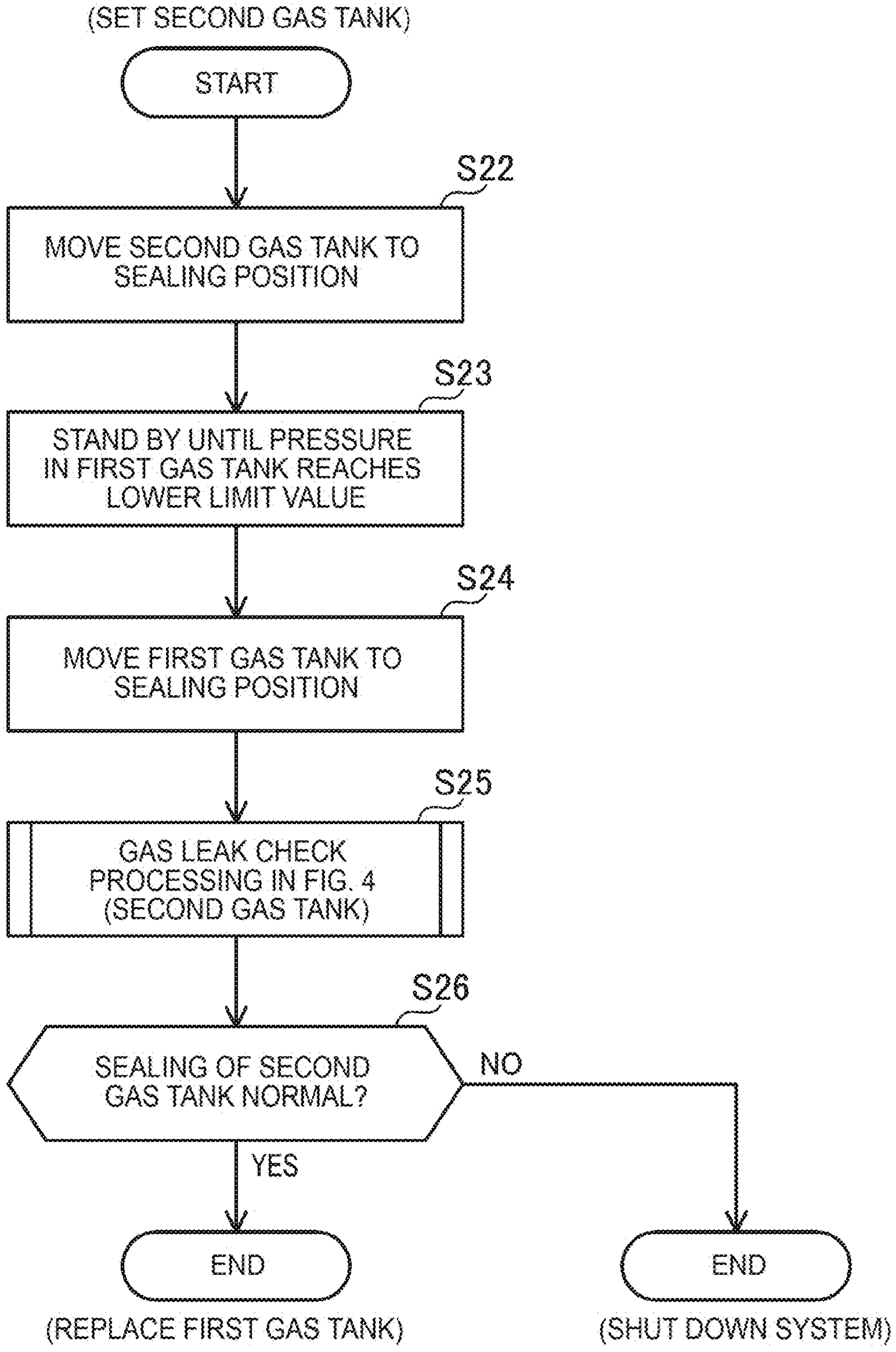
FIG. 6 is a flowchart of gas leak check processing (second embodiment).

A gas supply system 2*a* according to a second embodiment will be described with reference to FIGS. 5 and 6. FIG. 5 is a block diagram of the gas supply system 2*a*. The gas supply system 2*a* includes two gas tanks 10*a* and 10*b*. Each of the two gas tanks 10*a* and 10*b* has the same structure as that of the gas tank 10 of the gas supply system 2 according to the first embodiment, and has the structure illustrated in FIGS. 2 to 4. Each of the two gas tanks 10*a* and 10*b* includes the neck 11 including the sealing 12 and the self-closing valve 20.

The gas supply pipe 30 of the gas supply system 2*a* branches into a plurality of branch paths 30*a* and 30*b* along the way, the branch path 30*a* being provided with a check valve 31*a* and a first pressure sensor 41*a*, and the branch path 30*b* being provided with a check valve 31*b* and a first pressure sensor 41*b*. Note that the branch paths 30*a* and 30*b* are each part of the gas supply pipe 30. The first pressure sensor 41*a* (41*b*) is provided on the upstream side of the check valve 31*a* (31*b*), and measures pressure in the branch path 30*a* (30*b*) on the upstream side of the check valve 31*a* (31*b*). Roles of the check valves 31*a* and 31*b* are the same as the role of the check valve 31 in the gas supply system 2 according to the first embodiment.

The gas tank 10*a* (10*b*) is set on an actuator 19*a* (19*b*). The actuators 19*a* and 19*b* are also the same as the actuator 19 according to the first embodiment.

The gas tank 10*a* is connected to the branch path 30*a* of the gas supply pipe 30, and the gas tank 10*b* is connected to the branch path 30*b*. In the gas supply system 2*a*, hydrogen gas is supplied to the fuel cell 90 alternately from each of the two gas tanks 10*a* and 10*b* through the gas supply pipe 30. That is to say, when the remaining gas amount in the one gas tank 10*a* falls below a predetermined remaining amount lower limit value, the gas supply system 2*a* stops the gas supply from the gas tank 10*a* and supplies gas from the other gas tank 10*b* to the fuel cell 90. The gas tank 10*a* can be replaced with a new gas tank while hydrogen gas is being supplied from the gas tank 10*b* to the fuel cell 90. When the remaining gas amount in the gas tank 10*b* falls below a predetermined remaining amount lower limit value, the gas supply from the gas tank 10*b* is then stopped, and gas is supplied from the other gas tank 10*a* to the fuel cell 90. The gas tank 10*b* can be replaced with a new gas tank while hydrogen gas is being supplied from the gas tank 10*a* to the fuel cell 90.

The gas supply system 2*a* performs a gas leak check prior to replacing the gas tank. FIG. 6 is a flowchart of gas leak check processing that is executed by a controller of the gas supply system 2*a*.

The gas leak check in the gas supply system 2*a* according to the second embodiment will be described with reference to the flowchart in FIG. 6. Note that in the example in FIG. 6, the gas tank 10*a* will be referred to as "first gas tank", and the gas tank 10*b* will be referred to as "second gas tank". In the example in FIG. 6, the second gas tank 10*b* is replaced while hydrogen gas is being supplied from the first gas tank 10*a* to the fuel cell 90. The gas leak check processing in FIG. 6 is started when a new second gas tank 10*b* is set on the actuator 19*b*.

The controller 50 moves the second gas tank 10*b* to the sealing position (step S22). In the sealing position, the connection space S of the second gas tank 10*b* is sealed off, and the self-closing valve 20 remains closed.

The controller 50 stands by until pressure in the first gas tank 10*a* reaches a predetermined lower limit value (step S23). A measurement value of the first pressure sensor 41*a* that is provided in the branch path 30*a* is equal to the pressure in the first gas tank 10*a*. There is a positive correlation between the remaining amount in the gas tank and the pressure thereof, in which the remaining amount in the gas tank reaches a remaining amount lower limit value when the pressure of the gas tank reaches the lower limit value. That is to say, the processing in step S23 is equivalent to "standing by until the remaining amount in the first gas tank 10*a* reaches the remaining amount lower limit value".

When the pressure in the first gas tank 10*a* reaches the lower limit value, the controller 50 moves the first gas tank 10*a* to the sealing position (step S24). The self-closing valve of the first gas tank 10*a* closes. Subsequently, the controller 50 performs the gas leak check processing in FIG. 4 regarding the second gas tank 10*b* (step S25).

When the gas leak check processing in FIG. 4 is executed regarding the second gas tank 10*b*, whether a gas leak is occurring at the sealing 12 of the second gas tank 10*b* is found. When the sealing of the second gas tank 10*b* is normal, the controller 50 moves the second gas tank 10*b* to the open valve position (YES in step S16, and step S17, in FIG. 4). The self-closing valve of the second gas tank 10*b* opens, and hydrogen gas is supplied from the second gas tank 10*b* to the fuel cell 90. When supply of hydrogen gas from the second gas tank 10*b* to the fuel cell 90 is started, a user replaces the first gas tank 10*a*. When a new first gas tank 10*a* is set, the gas leak check processing in FIG. 6 is started regarding the new first gas tank 10*a*.

When the sealing of the second gas tank 10*b* is not normal, the controller 50 outputs a sealing abnormality signal indicating that an abnormality is occurring at the sealing 12 of the second gas tank 10*b* (NO in step S16, and step S18, in FIG. 4). The display device 51 that has received the sealing abnormality signal outputs a message indicating that a gas leak is occurring at the sealing 12 of the second gas tank 10*b* (the display device 51 turns on a warning lamp or emits a warning sound). The controller 50 then shuts down the system (step S19 in FIG. 4).

Note that while the gas leak check for the second gas tank 10*b* is being performed, hydrogen gas filling the gas supply pipe 30 further downstream of the check valves 31*a* and 31*b* continues to be supplied to the fuel cell 90. That is to say, supply of hydrogen gas to the fuel cell 90 continues even while the gas leak check processing is being executed. There is no need to shut down the fuel cell 90 while the gas leak check processing is being executed.

By providing a plurality of gas tanks, the gas supply system 2*a* enables one gas tank to be replaced while supplying hydrogen gas from the other gas tank to the fuel cell 90.

Points to be noted regarding the technology that is described in the embodiments will be described. In the second embodiment, the gas supply system 2*a* includes the two gas tanks. The gas supply system that is disclosed in the present specification may include three or more gas tanks. The controller 50 that has detected occurrence of a gas leak at the sealing 12 outputs a sealing abnormality signal indicating that a gas leak is occurring. The sealing abnormality signal may be output to a host computer that manages the gas supply system, or to a terminal of a staff member that manages the gas supply system.

The gas supply system 2 (2*a*) according to the embodiments supplies hydrogen gas to the fuel cell 90. The fuel cell 90 is an example of a gas consuming device. The gas consuming device to which the gas supply system 2 (2*a*) supplies gas may be a device other than the fuel cell 90. The pressure of gas that is suitable for operation of the gas consuming device is lower than the internal pressure of the gas tank 10. Accordingly, the gas consuming device can continue to operate with the gas that is accumulated in the gas supply pipe 30 downstream of the check valve 31, while the gas leak check processing is being executed.

While specific examples of the present disclosure have been described in detail above, these are merely exemplary and do not limit the scope of the claims. The technology that is described in the claims includes various modifications and variations of the specific embodiments that are exemplified above. The technical elements described in the present specification or illustrated in the drawings exhibit technical utility independently or in various combinations, and are not limited to the combination set forth in the claims as filed. Also, the technology exemplified in the present specification or in the drawings can achieve a plurality of purposes at the same time, and achieving one of the purposes in itself provides technical utility.

What is claimed is:

1. A gas supply system, comprising: a gas tank that includes a self-closing valve that opens when a push rod is pushed in and that closes when the push rod is pulled out; a gas supply pipe to which the gas tank is connected, at a distal end of which the push rod is provided, and that leads gas from the gas tank to a gas consuming device; an actuator that moves the gas tank forward and backward relative to the gas supply pipe; a sealing that seals off a connection space including an opening of the self-closing valve and the distal end of the gas supply pipe, when a distance between the self-closing valve and the push rod is shorter than a predetermined threshold value distance; a check valve that is provided in the gas supply pipe and that suppresses backflow of gas; a first pressure sensor that measures a pressure in the gas supply pipe upstream of the check valve; a second pressure sensor that measures a pressure in the gas supply pipe downstream of the check valve; and a controller, wherein the controller controls the actuator to move the gas tank forward until the self-closing valve is pushed open, and then to move the gas tank backward to a position where the self-closing valve is closed while maintaining the connection space in a sealed off state, the controller is configured to cause the gas tank to be moved forward such that the self-closing valve opens again when a measurement value of the first pressure sensor is equal to or higher than a measurement value of the second pressure sensor after a predetermined amount of time elapses;

the controller outputs a signal indicating that a gas leak is occurring when the measurement value of the first pressure sensor is lower than the measurement value of the second pressure sensor.

2. The gas supply system according to claim 1, wherein:

the gas supply pipe is divided into a plurality of branch paths;

each of the branch paths is provided with the first pressure sensor, the check valve, and the push rod; and the gas tank is connected to each of the branch paths.

* * * * *